INVENTORS
KLAUS E. DUFTSCHMID
JOHANNES STEIDL
RUPERT PATZELT
WOLFGANG ATTWENGER

United States Patent Office 3,497,693
Patented Feb. 24, 1970

3,497,693
THICKNESS GAUGE FOR FAST MOVING DISCONTINUOUS MATERIALS
Klaus E. Duftschmid, Johannes Steidl, Rupert Patzelt, and Wolfgang Attwenger, Vienna, Austria, assignors to Osterreichische Studiengesellschaft fur Atomenergie Ges.m.b.H., Vienna, Austria, a firm of Austria
Filed Mar. 15, 1966, Ser. No. 534,537
Claims priority, application Austria, Mar. 19, 1965, 2,549/65, 2,550/65
Int. Cl. H01j *39/00, 37/00;* G01t *1/16*
U.S. Cl. 250—83.3                                   10 Claims

ABSTRACT OF THE DISCLOSURE

A method for measuring physical magnitudes, as for example the thickness of a material, is comprised of the steps of positioning a detector in spaced operative relationship to a source of radiation for providing output pulses or signals to a counter, introducing the material to be measured into the radiation path between the source and the detector, counting the output pulses for a predetermined period of time to obtain a first pulse count value, withdrawing the material from the radiation path and introducing a comparison absorber into the radiation path, measuring the time required for the pulse count to reattain the first pulse count value for use as a measure of a physical magnitude of the material.

An apparatus for measuring physical magnitudes, such as the thickness of a material, is formed of a source of radiation and a detector positioned in opposed spaced operative relationship to the source for receiving output pulses. A pulse counter is connected to the detector for counting the pulses it receives and, in addition, a time counter is connected to the pulse counter for establishing the time period during which a certain number of pulses have been counted. A comparison absorber is mounted in the apparatus for movement into and out of the path of radiation between the source and the detector.

SUMMARY OF THE INVENTION

This invention concerns a method and an apparatus for the measurement of physical magnitudes such as thickness, weight per unit area, density, and radiation absorption, for example, of materials and is characterised in that the material to be measured is led into the radiation path between a source of radiation and a detector from which impulses are fed to a counter and counted for a predetermined time, and in that thereafter, instead of the material, a comparison absorber is brought into the radiation path and the time is measured until the same impulse count is again reached, and a conclusion is drawn from the time last measured, on the thickness of the material.

It is possible to determine, by means of the invention, the thicknesses of discontinuous materials such as for example panels, sheets of metal or the like passing at high speed through the measuring station. An automatic compensation of errors in measurement takes place and a direct indication of the valve measured is given. The measurement takes place purely digitally. Due to the digital working of the measurement data in conjunction with an especially rapid detector (plastic scintillator) the highest obtainable accuracy results in extremely short measurement times (for example under 1 sec.). The method according to the invention has numerous advantages as against the existing method. Thus the result of measuring is independent of any decrease in activity of the source of radiation, for example by reason of the half life valve, should a radioactive source of radiation be employed. Again, alterations in absorption due to the detector or source becoming dirty or due to electronic instabilities are eliminated. Complicated arithmetical procedures are avoided by means of the features of the invention.

The invention will be further apparent from the following description, with reference to the several figures of the accompanying drawings, which show, by way of example only, one form of apparatus for carrying out the method of the invention.

Figure 1:
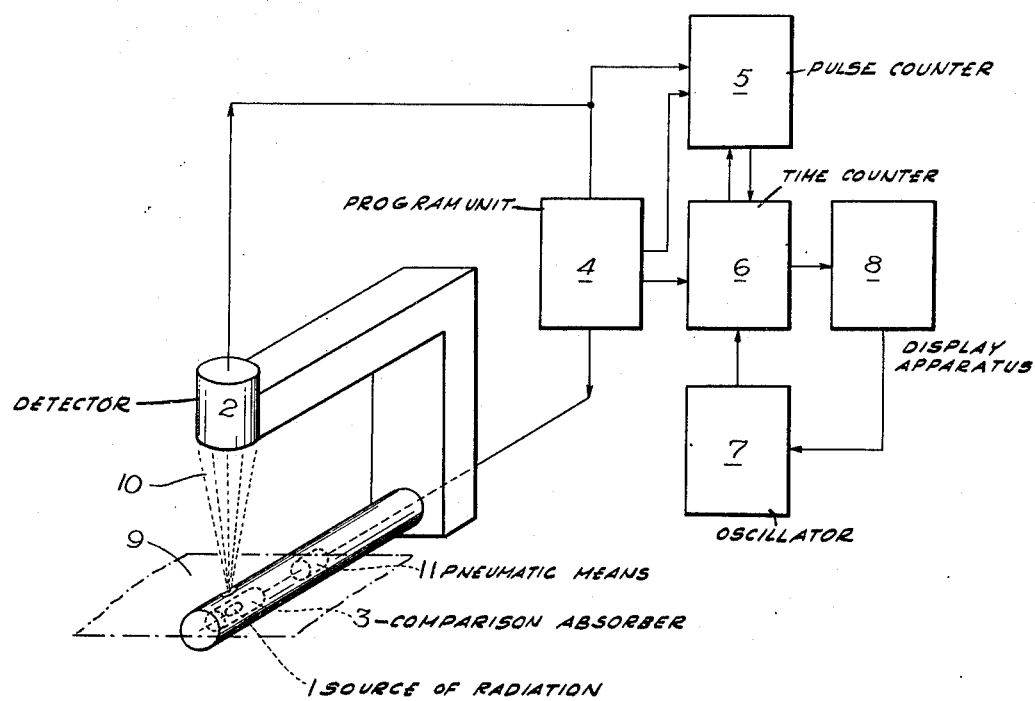
Figure 2:
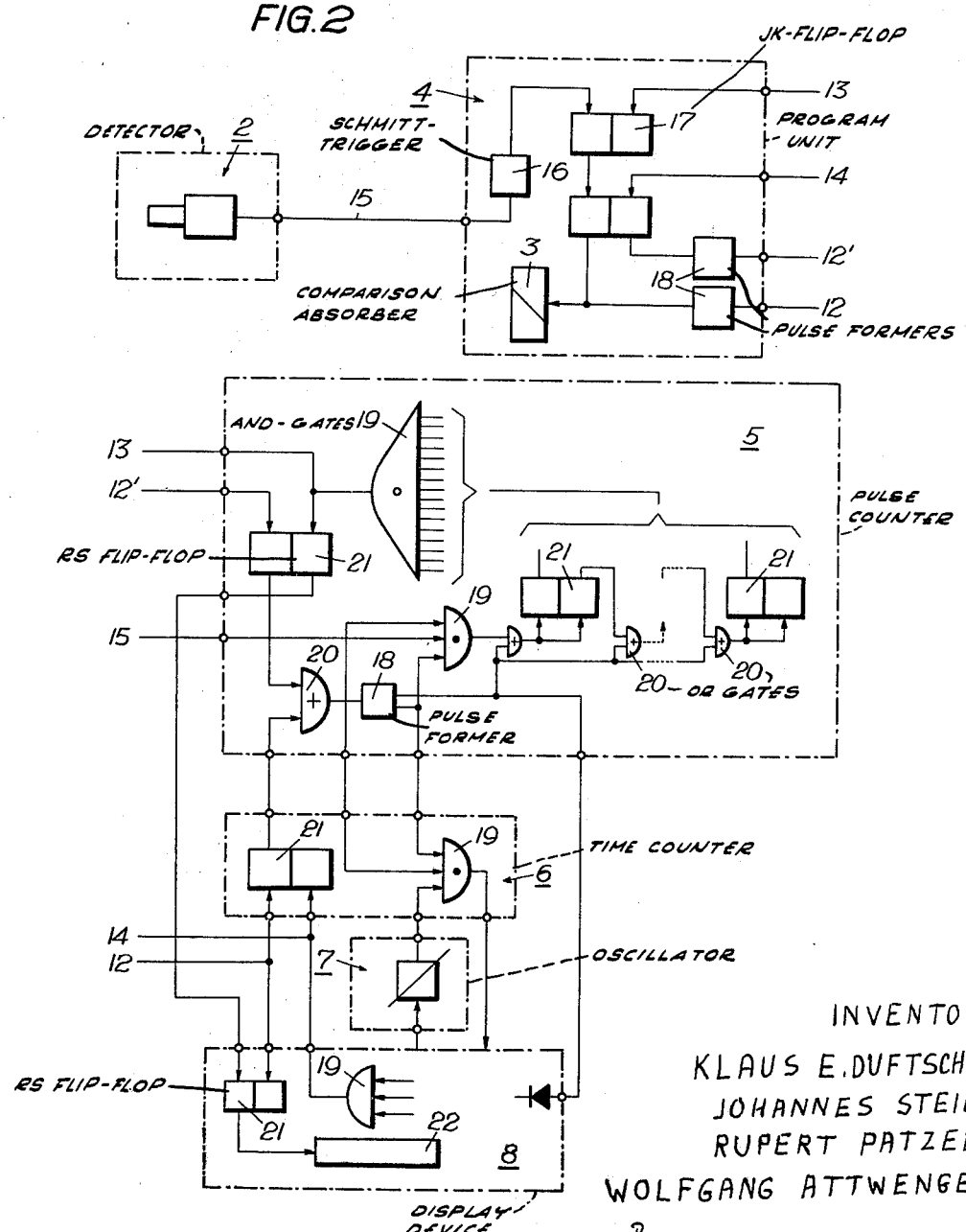

Of the drawings:
FIG. 1 shows schematically a complete diagram of the apparatus;
FIG. 2 shows a schematic block connection diagram of the apparatus; and
FIGS. 3 and 4 serve for interpretation.

The apparatus comprises a source of radiation 1, a movable comparison absorber 3 for example of Plexiglas, a detector 2, a pulse counter 5 and a time counter 6. The source of radiation 1 is preferably a radioactive source. Ru-106 has proved particularly suitable for materials to be measured having a weight per unit area lying in the range of from 0.5–1.5 gm./cm.$^2$. It is however quite possible to use instead of a radio-active source some other source, such as for example, an X-ray tube, or a source of light, ultra sonic vibration or the like.

The detector 2 is adapted to detect the radiation from the source in question and lies opposite to the latter. As already stated, plastic scintillators of known kind can be employed with advantage.

The principle of the measurement will now be explained in detail.

The material to be measured is brought to the measuring station by any suitable means, for example rollers. Due to the intrusion of the material 9 into the radiation path 10 between the source of radiation 1 and the detector 2, an alteration of the rate of counting takes place due to the absorption of the material. On falling below a preselected threshold, i.e., when the count rate reaches a given value, an electronic program unit 4 is activated. By this, first of all, the comparison absorber 3 is removed from the radiation path 10, for example by pneumatic means 11. After an adjustable period of delay, which is determined by the marginal zone of the material upon which zone a measurement is not to be made, the measurement of the actual value commences. This period of delay is likewise determined by the program unit 4. The marginal zones should not be included in the measurement as otherwise errors in the result of the measurement might arise.

The pulses coming from the detector 2 are fed through a pulse gate in an electronic pulse counter 5. Simultaneously, a time counter 6 commences operation and ends the counting of the actual value after an adjustable time $ti$ by locking the pulse gate. The pulse counter 5 has, during this time $ti$, stored a pulse count N, which results as the product of the count rate $Ni$ ($N = Ni \times ti$) and the measurement time $ti$. After completion of the measurement of the actual value, the comparison absorber 3 is again positioned in the radiation path 10 by means of the program unit 4. Due to the material to be measured leaving the measuring path an alteration of the rate of counting takes place which again releases the program unit 4. After a further preselected period of delay the measurement of the desired value commences.

On measurement of the desired value, the pulses passing through the comparison absorber 3 are counted in the pulse counter 5 and in fact the time $tv$ is now determined with the time counter 6 which the count rate, established by the comparison absorber, requires to reach the same pulse count N as was reached in the pulse counter on the preceding measurement of the actual value.

At the same time a count rate $Nv$ is established by the comparison absorber.

Now it follows that:

$$ti \times Ni = N = tv \times Nv$$

and therefore that:

$$tv = ti \times Ni / Nv$$

The time $tv$ is therefore only proportional to the count rate of the actual value or inversely proportional to the thickness. All multiplicative errors of measurement are eliminated by the above equation.

During measurement of the desired value, the time counter is controlled by an oscillator 7 so that in each case the product of the oscillator frequency and time of the comparison measurement appears on a display apparatus 8 as the display of the value measured. If a linear display is desired in the display apparatus 8 then it is possible to control, by means of each display, the frequency of the oscillator 7, that any nonlinear relation between measurement value and time of comparison measurement can be changed into a direct linear display of the measurement value.

A block connection diagram is shown in FIG. 2. The pulses received by the detector 2 are fed through the conductor 15 to a Schmitt trigger 16 which is provided in the program unit 4. The Schmitt trigger 16 is connected in a known manner to a JK-flip-flop 17. A pulse former 18 is also located in the program unit 4. The program unit 4 is connected by means of conductors 12' and 13 to the pulse counter 5. AND-gates 19 and OR-gates 20 as well as RS-flip-flops 21 and pulse former 18 are located in known manner in the pulse counter 5. The program unit 4 is connected to the time counter 6 by the conductor 14. The conductor 12 of the program unit 4 is likewise connected to the time counter. The time counter 6 is controlled by means of an oscillator 7. Both the time counter 6 and the oscillator 7 are connected to the display unit 8. In the display device a display can take place by figures at 22.

Figure 3:
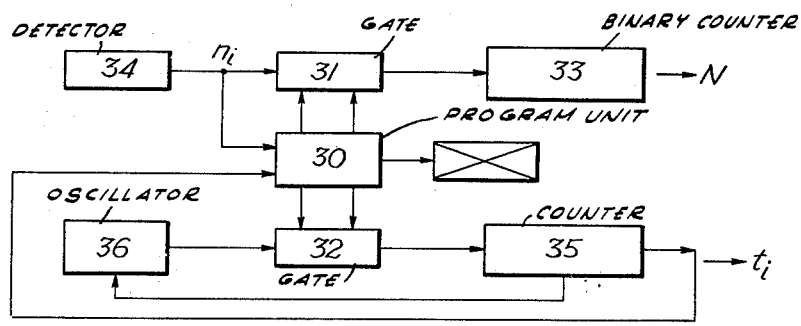
Figure 4:
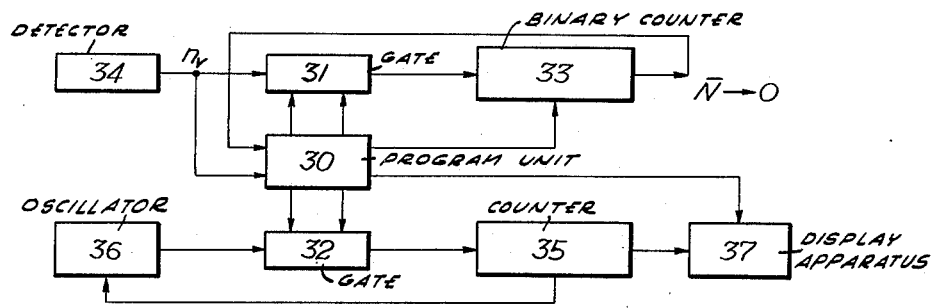

A simplified block connected diagram is shown in FIGS. 3 and 4 from which the manner in which the invention works is apparent. FIG. 3 shows the measurement of the actual value and FIG. 4 the measurement of the desired value.

Due to the alteration of the count rate by reason of the intrusion of the material to be measured into the path of the radiation, the program unit 30 is activated whereby the comparison absorber is removed. The gates 31 and 32 are opened after a given period of delay which the unmeasured marginal zone of the material determines. The binary counter 33 counts the pulses from the detector 34 and a secondary binary counter 35 counts the pulses of an oscillator 36. When the count is reached in the counter 35 which corresponds to the thickness of the absorber, then the program unit 30 closes the gates and the measurement of the actual value is ended. The comparison absorber is brought again into the radiation path. A number N in binary form is now located in the counter 33.

When the material is removed from the radiation path the measurement of the desired value is commenced by means of the increase in the rate of count. The number N is invested in the counter 33, each flip-flop in the binary counter being inverted. After a period of delay the gates 31 and 32 are again opened and the time is counted which is needed for the value N to be reached again in the counter 33. The overrunning of the counter then ends the measurement of the desired value. The frequency of the oscillator 36 is altered in accordance with a program. If a linear display is required, then the frequency of the oscillator 36 may be altered in accordance with a program derived from the functional relation between the measurement value and the time of the comparison measurement. The display apparatus 37, during the measurement runs continuously with the counting in the counter 35.

The counter displayed therefore runs through all intermediate values from an initial value to an end value which is the result of the measurement. The alteration of the frequency of the oscillator 36 can now be coupled with given values of count in the display apparatus, i.e., the alteration of frequency takes place according to program dependent on time, whereby by means of the coupling to given display values a positive fault free synchronisation is obtained.

The present invention not only concerns the measurement of thickness but quite generally a method for the influencing especially the linearisation of measured magnitudes. For this purpose the measured magnitude is changed into another magnitude which is determined as the function of the measured magnitude. From this a display value is built which controls the drive for the displace device, whereby the influencing is given. For example the measured magnitude may be changed directly into the time for which the time counter is driven by means of the frequency of a pulse producer. For the compensation of the nonlinearity of the measured magnitude (as is given for example by an absorption graph) the momentary frequency of the pulse producer can be controlled from the measured value for the time being. Thus there results the desired dependance of the measured magnitude on the display, for example a linear relation.

The measured magnitude could also be changed into a voltage and the sensitivity of the appliance, displaying the voltage, be altered according to the value of the voltage for the time being. By means of the method according the invention the display can not only be linearised but changed to depend upon some other law, e.g., logarithmic, exponential or the like. If linearisation is to take place, then the curve of the relation between the display value and the measured magnitude must be reflected around a straight line, whereby the axis of reflection gives the linear relation between the two magnitudes.

On the drawing the actions of the individual units are shown symbolically by arrows.

The invention is particularly suitable for determining the thickness or the weight per unit area of discontinuous materials, for example asbestos-cement sheets, plastic sheets, glass sheets, or the like, an adjustment of the production process is dependence of the thickness of the end product being also possible. However, the invention is not restricted thereto, it is possible to measure band shaped material in that this material is measured in sections. It is also possible to determine by means of the present method dependant physical magnitudes such as temperature and pressure.

What we claim is:

1. A method for measuring physical magnitudes, such as thickness, weight per unit area, density, radiation absorption, or the like of materials, said method comprising the steps of: positioning a detector in spaced operative relation to a source of radiation to provide output pulses to a counter; introducing the material to be measured into the radiation path between the source and the detector; counting the output pulses for a predetermined time to obtain a first pulse count value; withdrawing the maereial from the radiation path; then introducing a comparison absorber into the radiation path; and measuring the time required for the pulse count to reattain said first pulse count value, as a measure of the physical magnitude to be determined.

2. A method, as claimed in claim 1, including the step of activating a program unit responsive to alteration of the pulse count rate upon movement of the material into and out of the radiation path.

3. A method, as claimed in claim 2, including the step of controlling the movement of the comparison absorber by the program unit.

4. A method, as claimed in claim 2, in which a time counter is provided; and using the program unit to activate the time counter after an initial delay period.

5. A method, as claimed in claim 1, including the step of using a time counter as a second counter; controlling the time counter by an oscillator; and displaying the product of the oscillator frequency and the time required for the pulse count to reattain said first pulse count value, as the measure of the physical magnitude to be determined.

6. A method, as claimed in claim 5, including the step of varying the oscillator frequency to obtain a nonlinear relation between the magnitude measured and the time required for the pulse count to reattain the first pulse count value, to compensate in a manner to obtain a linear display of the magnitude to be determined.

7. A method, as claimed in claim 1, including the step of using an investible binary counter as the pulse counter; and including the step of restoring the counter content to zero after obtaining of said first pulse count value and before measuring the time required for the pulse count to reattain said first count value upon introduction of the comparison absorber into the radiation path.

8. A method, as claimed in claim 1, in which, to obtain a linear value of the determined magnitudes, the measurements of the magnitudes are changed into other measurements as a function of the measurement magnitudes; and providing a display value resulting therefrom and indicating the linear function of the original measurement magnitude.

9. A method, as claimed in claim 8, in which the measurement magnitude is changed into a time displayed in a time counter driven at the frequency of an impulse producer; and controlling the momentary frequency of the impulse producer as a function of each display value.

10. A method, as claimed in claim 8, in which the measurement magnitude is changed into a voltage displayed on a voltage display device; and controlling the sensitivity of the voltage display device as a function of the momentary values of the voltage.

References Cited

UNITED STATES PATENTS

| | | |
|---|---|---|
| 2,829,268 | 4/1958 | Chope. |
| 3,001,073 | 9/1961 | Alexander et al. _____ 250—83.3 |
| 3,183,354 | 5/1965 | Amrehn _____ 250—83 |

RALPH G. NILSON, Primary Examiner

A. B. CROFT, Assistant Examiner

U.S. Cl. X.R.

250—43.5